United States Patent [19]

Dobras

[11] 4,183,465

[45] Jan. 15, 1980

[54] RECORD AND PRINTING MEMBER FOR MAKING THE RECORD

[75] Inventor: Bruce W. Dobras, Dayton, Ohio

[73] Assignee: Monarch Marking Systems, Inc., Dayton, Ohio

[21] Appl. No.: 538,226

[22] Filed: Jan. 2, 1975

[51] Int. Cl.$^2$ .................. G06K 19/06; G06K 7/10; B41F 33/00; G06K 9/00

[52] U.S. Cl. ................................ 235/494; 101/2; 235/463; 340/146.3 Z; 101/372

[58] Field of Search .................. 250/568, 569, 570; 235/61.11 E, 61.11 D, 61.12 N, 61.12 M, 494, 463; 340/173 LT, 146.3 Z; 283/18, 19, 20, 21, 22; 101/1, 2

[56] References Cited

U.S. PATENT DOCUMENTS

| | | | |
|---|---|---|---|
| 3,689,742 | 9/1972 | Kagari | 235/61.11 E |
| 3,731,063 | 5/1973 | Bickl | 235/61.11 E |
| 3,744,025 | 7/1973 | Bilgutay | 340/146.3 Z |
| 3,784,795 | 1/1974 | Tuhro | 235/61.11 E |
| 3,808,406 | 4/1974 | Oberg | 235/61.12 N |

OTHER PUBLICATIONS

Webster's Third New International Dictionary, G&C Merriam Co., Springfield, Mass., 1965, p. 2236.
UPC Symbol Specification, dist. by Distribution Number Bank, Wash., DC, 1973, cover page and pp. 22, 23 and 24.

Primary Examiner—Robert M. Kilgore
Attorney, Agent, or Firm—Joseph J. Grass

[57] ABSTRACT

There are disclosed various embodiments of records having characters which represent data and incorporate a printability gauge. The characters can be of a type which are human readable or they can be of a type which can be optically scanned by optical scanning equipment. Also disclosed are printing members having one or more printing elements for printing the above-mentioned characters.

4 Claims, 18 Drawing Figures

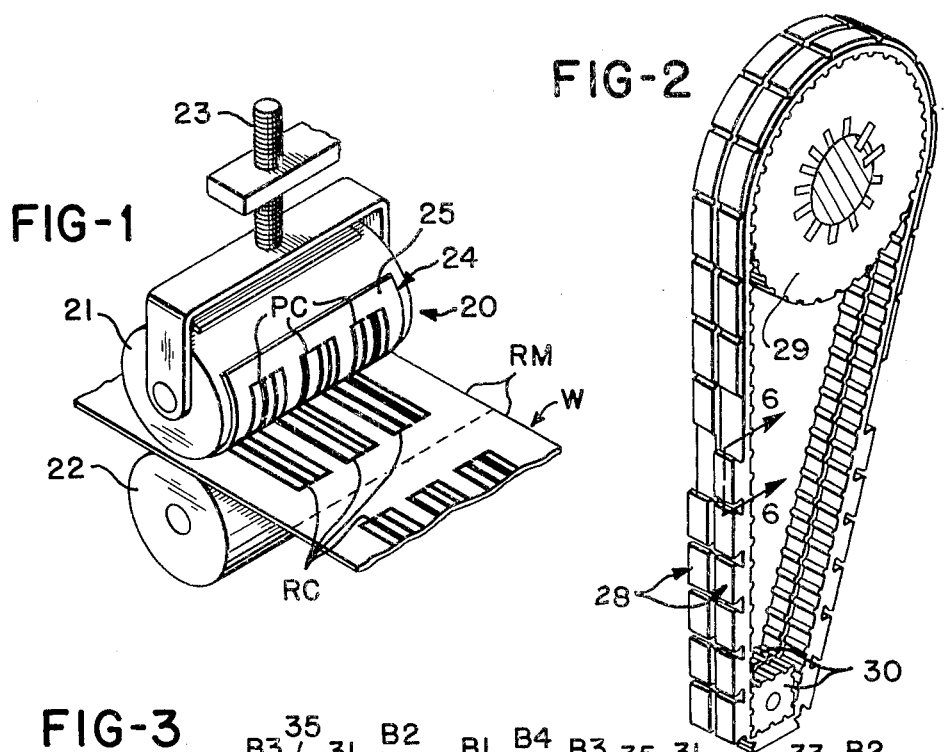
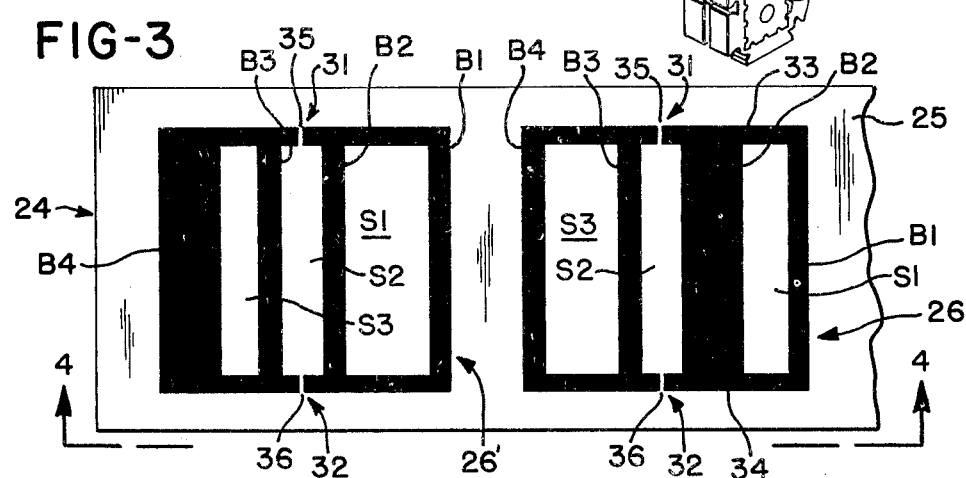
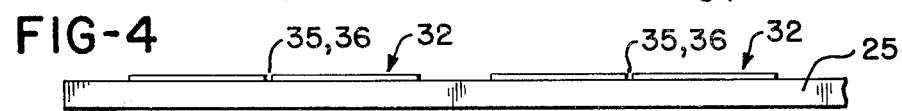
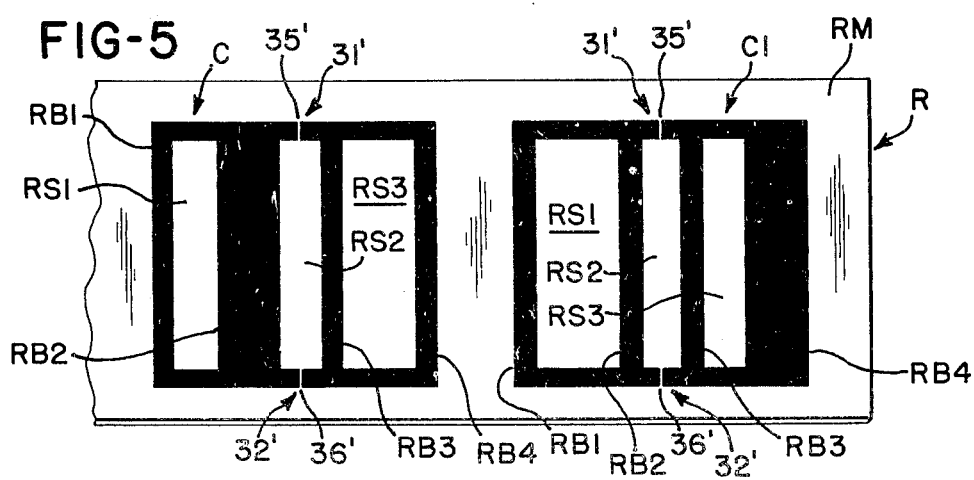

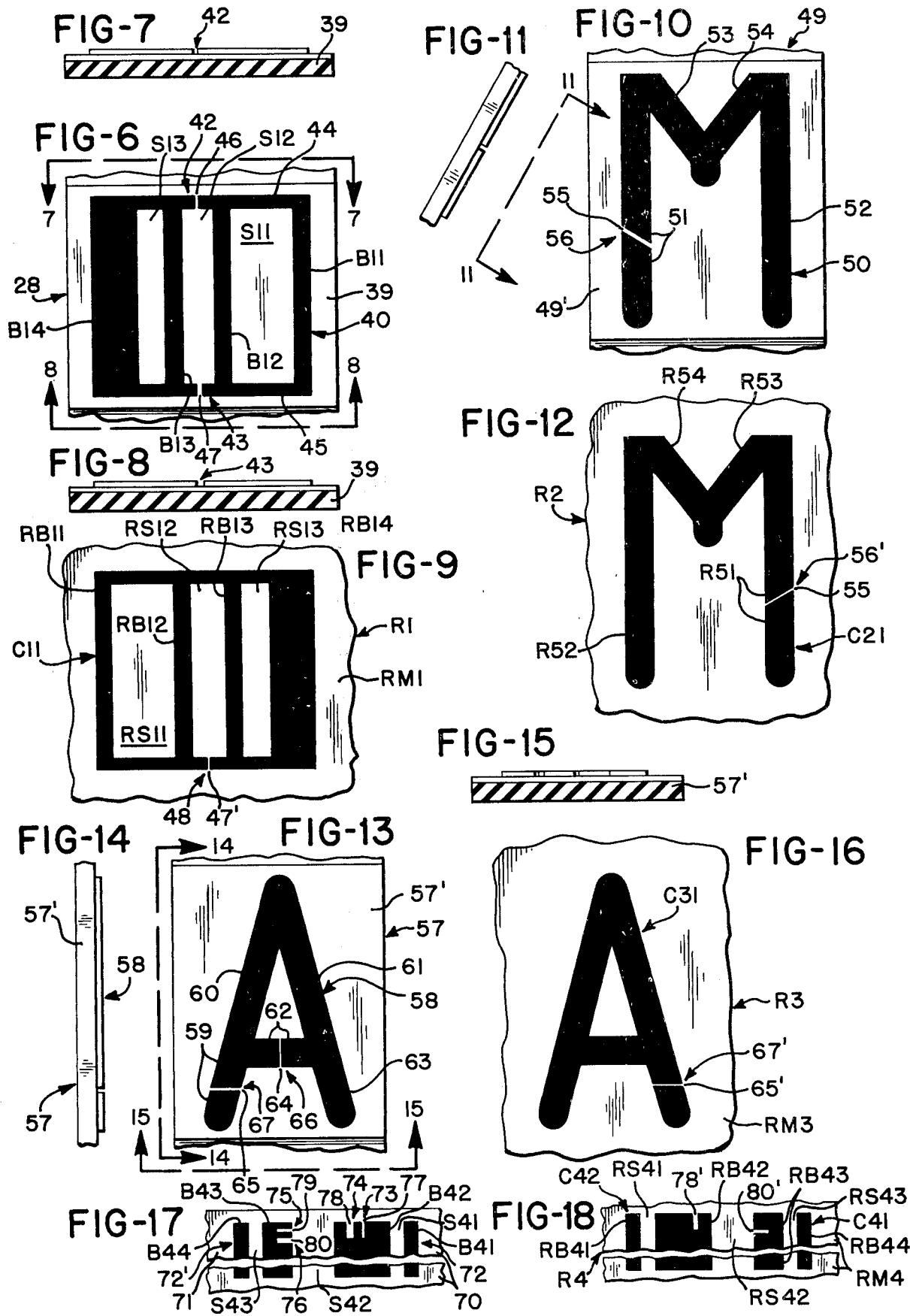

RECORD AND PRINTING MEMBER FOR MAKING THE RECORD

BACKGROUND OF THE INVENTION

1. Field of the Invention

This invention relates to the art of records and to printing members for printing records.

2. Brief Description of the Prior Art

It is known to have printability gauges of the type described in the "UPC Symbol Specification" dated May, 1973, pages 22 through 24, published by the Distribution Number Bank, Washington, D.C. 20006, U.S.A.

SUMMARY OF THE INVENTION

The present invention is directed to incorporating directly in the printed character, a gauge which will enable a quick visual determination to be made as to the quality of the printing. The invention is also directed to a printing member for printing the character. The gauge is provided by a small intra-character gap which preferably is either located in the portion of the character where it will not be detected by any scanning equipment, or is so small that use of commercially available scanning equipment will not result in an erroneous reading of the character. The present invention is particularly useful in applications wherein the characters are to be optically scanned by scanning equipment, however, it can be incorporated into characters which are only intended to be read with the human eye. The intra-character gaps are preferably at least about 0.001 inch in width and less than about 0.005 inch in width. The gaps are also of a width that is considerably less than the width of the character and less than the width of the bar or line-shaped element that forms a part of the character.

BRIEF DESCRIPTION OF THE DIAGRAMMATIC DRAWINGS

FIG. 1 is a perspective view of a printer having a printing member in the form of a plate;

FIG. 2 is a perspective view of a fragmentary portion of a printer in which the printing members are endless printing bands;

FIG. 3 is a top plan fragmentary view of the printing plate shown in FIG. 1, depicted in the flat condition;

FIG. 4 is an elevational view taken along line 4—4 of FIG. 3;

FIG. 5 is a perspective view of a record member on which characters are printed using the printing member shown in FIGS. 3 and 4;

FIG. 6 is a view of a fragmentary portion of a printing band as shown in FIG. 2, taken along line 6—6;

FIG. 7 is a sectional view taken generally along line 7—7 of FIG. 6;

FIG. 8 is a sectional view taken generally along line 8—8 of FIG. 6;

FIG. 9 is a top plan view of a record member on which a character is printed using the printing member shown in FIGS. 6, 7 and 8;

FIG. 10 is a view similar to FIG. 6, but showing an alpha character;

FIG. 11 is a fragmentary view taken generally along line 11—11 of FIG. 10;

FIG. 12 is a top plan view of a record member on which a character is printed using the printing member shown in FIGS. 10 and 11;

FIG. 13 is a view similar to FIG. 10, but showing another alpha character;

FIG. 14 is a view taken along line 14—14 of FIG. 13;

FIG. 15 is a sectional view taken along line 15—15 of FIG. 13;

FIG. 16 is a top plan view of a record member on which a character is printed using the printing member shown in FIGS. 13, 14 and 15;

FIG. 17 is a fragmentary top plan view of a printing member in accordance with another embodiment of the invention; and FIG. 18 is a top plan view of a record member on which a character is printed using the printing member shown in FIG. 17.

DETAILED DESCRIPTION OF THE PREFERRED EMBODIMENTS

With reference to FIG. 1, there is shown diagrammatically a printer generally indicated at 20 having a printing roll 21 and a platen roll 22 for printing on a web W of record members RM. The roll 21 is suitably mounted for movement toward and away from the roll 22 and is adjustable by means of screw 23 for movement toward and away from the roll 22. The roll 21 is shown to carry a printing member 24 in the form of a plate. The printing member 24 is shown to comprise a base portion 25 and character-representing elements PC. The elements PC print characters RC on the record members RM.

FIG. 2 depicts printing members 28 in the form of printing bands of a type as are used in commercially available printing apparatus according to U.S. Pat. No. 3,767,098 to Pabodie, patented Oct. 23, 1973. The printing members 28 are trained about selectively rotatable sets of wheels 29 and 30. The wheels 29 (only one of which is shown in FIG. 2) are selectively rotatable to advance respective printing members 28. As the selected wheel 29 is driven the respective wheel 30 is consequently rotated to the selected position.

With reference to FIGS. 3 and 4, there is shown a printing member 24. The element 26 is shown to include a plurality of parallel bar-shaped elements B1, B2, B3 and B4. The elements B1, B2, B3 and B4 are shown to be parallel and to be of constant width throughout their lengths. Intervening spaces S1, S2 and S3 separate elements B1 and B2, B2 and B3, and B3 and B4 from each other. In the illustrated embodiment the relative widths of elements B1 through B4 and the spaces S1 through S3 have code significance representative of a character. The elements B1 through B4 and the spaces S1 through S3 are shown to be relatively short. However, they can be made of any suitable length.

Elements 26 and 26' incorporate printability gauges generally indicated at 31 and 32. The gauges 31 and 32 are shown to be comprised of bar-shaped elements 33 and 34 which are disposed on the base portion 25. The bar-shaped elements 33 and 34 are shown to extend transversely to the bar-shaped elements B1 through B4 and the spaces S1 through S3, and are shown to be joined to the one ends of the elements B1 through B4. The elements 33 and 34 are each interrupted by means of respective gaps 35 and 36 which are considered to be intra-character gaps in that they are a part of the character and more specifically are considered to be intra-element gaps because they are part of respective elements 33 and 34. The gaps 35 and 36 are shown to be of generally uniform width and preferably of a width which is substantially less than the width of any elements B1 through B4. As seen in the drawings, the gaps 35 and 36 extend parallel to the elements B1 through B1 and are in alignment with each other, but out of alignment with any of the elements B1 through B4. The character-representing element 26' is the same as the character-representing element 26, except that the element 26' represents different data than the elements 26 because of the different widths of its elements B1 through B4 and spaces S1 through S3. Accordingly, the same reference characters are used for the element 26' as for the element 26. It is preferred to make the intracharacter gaps 35' and 36' equal and relatively small, by way of example, less than seventy percent of the width of the smallest width element B1 through B4. Specifically a typical character-representing element 26 is about 0.083 inch wide and the gaps 35 and 36 are preferably no more than about 0.004 inch in width. Preferably the minimum width of the gaps 35' and 36' is at least about 0.001 inch. The invention is not to be considered limited to the code represented but is applicable to other and different codes. With reference to FIG. 5, there is shown a record R comprising a record member RM imprinted with characters C and Cl resulting from use with printing member 24. The characters C and Cl are each shown to include code bars RB1, RB2, RB3 and RB4 and intervening spaces RS1, RS2 and RS3. The printability gauges 31' and 32' are represented by respective gaps 35' and 36'. The gaps 35' and 36' are shown to be somewhat narrower than the gaps 35 and 36 in the bar-shaped elements 33 and 34 of the printing members 24 in that due to pressure of the printing member 24 on the record member RM during printing the ink will spread slightly to cause the gaps 35' and 36' to be smaller than the gaps 35 and 36. In this embodiment the gaps 35' and 36' should optimally be just large enough to be visible under a five power magnifier, that is, by way of example not limitation the gaps should be at least about 0.001 inch in width. If the gaps 35' and 36' which ought to have been produced by the gaps 35 and 36 in the bar-shaped elements 33 and 34 do not appear on the record member RM then either the printing member 24 was too heavily inked, or the printing pressure was too great, or both. Consequently, the inking mechanism would have to be adjusted, or the impression control of the printer 20 would have to be adjusted, or both.

With reference to the embodiment of FIGS. 6 through 9, there is shown the printing member 28 and a record R1. The printing member 28 comprises a base portion 39 and element 40 representative of a character. The element 40 is comprised of bar-shaped printing elements B11 through B14 and their intervening spaces S11, S12 and S13. Printability gauges 42 and 43 are comprised of bar-shaped elements 44 and 45 having respective constant width gaps 46 and 47. The gap 46 is smaller than the gap 47. More specifically the gap 46 is so small that with the proper inking and printing pressure exerted by the printing member 38, only a constant width gap 47' will be produced by the gap 47 in printability gauge 43 on record member RM1 of record R1. The gap 46 of the printability gauge 42 is too small to print a corresponding gap on the record member RM1 and accordingly, when the inking and the printing pressure are correct a record according to FIG. 9 will be produced. If the gauge 42 leaves a gap on the record member RM1 corresponding to the gap 46, then the inking, or the printing pressure, or both are too light. If, however, the gap 47 of the printability gauge 43 does not leave a gap 47' on the record member RM1, then the inking is too heavy, or the printing pressure is too great, or both. With reference to FIG. 9, character C11 is shown to include a printability gauge generally indicated at 48, bars indicated at RB11, RB12, RB13 and RB14, and intervening spaces indicated at RS11, RS12 and RS13. The gap 47' is preferably at least about 0.001 inch in width and, as in the embodiment of FIGS. 1 and 3 through 5, less than about 0.005 inch in width. The gap 47' is preferably less than about seventy percent of the width of the smallest width code bar B11 through B14. Preferably the gap 47' is less than about ten percent of the width of the character transversely across the code bars B11 through B14.

With reference to FIGS. 10, 11 and 12, there is shown another embodiment of printing member 49 and a record R2. The printing member 49 has a base portion 49' and an element 50 representative of a character. The character "M" according to the OCR-A font is represented. The element 50 is comprised of a plurality of element portions 51 and 52 which extend generally parallel to each other and inclined portions 53 and 54 joined to each other and to respective element portions 51 and 52. The element 50 is shown to have a gap 55 which comprises a printability gauge generally indicated at 56. Again, the gap 55 is considered to be an intra-character gap but is also considered to be an intra-element gap. Although the gap 55 is represented as extending at an inclined angle across the element portion 51, it can extend transversely if desired. In FIG. 12, the record R2 is illustrated as having a character C21 comprised of element portions R51 through R54. The character C21 comprises an intra-character or intra-element gap 55' in the element portion R51 which constitutes a printability gauge 56'. The widths of the gaps 55 and 55' are substantially constant and substantially less than the width of respective lines 51 and R51.

With reference to the embodiment of FIGS. 13 through 16 there is shown a fragmentary portion of a printing member 57 which is part of a printing band. The printing member 57 has a base portion 57' on which there is a character representing element 58 having element or line portions 59, 60, 61, 62 and 63. The element 58 is represented to be an "A" according to the OCR-A font. The element 58 has an intra-character or intra-element gaps 64 and 65. The gaps 64 and 65 in respective line portions 62 and 59 constitute printability gauges generally indicated at 66 and 67 respectively. The gap 64 is smaller than the gap 65 so that the character C31 printed on the record R3 has a gap 65' which represents the printability gauge 67', but there is no gap produced on the record member RM3 by the gap 64 in the line portion 62 of the record member 57. The gap 64 will not result in a corresponding gap on the record member RM3 when the inking and heaviness of the impression pressure are correct. However, the gap 65 will be provided on the record member RM3. If a gap corresponding to the gap 62 results on the record member RM3, then inking, or the impression pressure, or both are too light. If there is no gap on the record member RM3 corresponding to gaps 64 and 65, then inking, or the impression pressure, or both are too great.

With reference to the embodiment of FIGS. 17 and 18, there is shown a broken-away portion of a printing member 70 and of a record R4. The record R4 has characters C41 and C42. The printing member 70 comprises a base portion 71 and elements 72 and 72' representative of two characters. The element 72 is comprised of constant width bar-shaped printing elements B41 and B42 and spaces S41 and S42 and element 72' is comprised of constant width bar-shaped printing elements B43 and B44 and a space S43 together with a space to the left of element B44. Likewise, the record R has printed constant width bars RB41 through RB44 and intervening spaces RS41, RS42 and RS43. Printability gauges 73 through 76 are comprised of respective constant width intra-character or intra-element gaps 77 through 80. The gap 77 is smaller than the gap 78 of the bar-shaped element B42, and the gap 79 is smaller than the gap 80 of the bar-shaped element B43. More specifically, the gaps 77 and 79 are so small that with the proper inking and printing pressure exerted by the printing member 70, only constant width gaps 78' and 80' will be produced by the respective gaps 78 and 80 on record member RM4 of record R4. The gaps 77 and 79 of the respective printability gauges 73 and 75 are too small to print a corresponding gap on the record member RM4 and, accordingly, when inking and printing pressure are correct a record according to FIG. 18 will be produced. If the gauges 73 and 75 leave respective gaps on the record member RM4 corresponding to the gaps 77 and 79, then the inking, or the printing pressure, or both are too light. If, however, the gaps 78 and 80 do not leave respective gaps 78' and 80' on the record member RM4, then the inking is too heavy, or the printing pressure is too great, or both.

The gaps 77 and 78 are shown to extend in the lengthwise direction of the element B42. The gaps 77 and 78 are shown to extend parallel to each other. The gaps 79 and 80 are shown to extend in the transverse direction of the element B43. The gaps 79 and 80 are shown to extend parallel to each other. The gaps 77 and 79 are preferably of the same length and width, and the gaps 78 and 80 are preferably of the same length and width. It is noted that the gaps 77 and 78 extend obliquely with respect to the gaps 79 and 80 and preferably at right angles to each other as shown. It is preferred to provide the gauges 73 and 74 in the widest element of one character, and the gauges 75 and 76 in the widest element of another character. It is noted that the element B42 is wider than the element B43. The elements B41 and B42 and the spaces S41 and an unnumbered space (of the same width as the space S41) to the right of the element B41 in FIG. 17 will print the character "6", and the elements B43 and B44 and the spaces S42 and S43 will print the character "0" according to the UPC Symbol Specification publication mentioned above.

In the embodiments of FIGS. 1 through 18, by way of example not limitation, the respective gaps 47', 55', 65', 78' and 80' are at least about 0.001 inch in width and not more than about 0.005 inch in width. The gaps 47, 55, 65, 78 and 80 in the respective printing members 28, 49, 57 and 70 are slightly wider than the resultant gaps 47', 55', 65', 78' and 80'. the gaps 35', 36', 47', 78' and 80' are less than about seventy percent of the width of the smallest bar, e.g. the respective bars RB3, RB13, RB41 and RB42, and less than about ten percent of the width of the characters C, C1, C2, C11, C41 and C42. Likewise, the gaps 55' and 65' are less than about seventy percent of the width of the smallest width line portions 51 through 54 and 59 through 63, and less than about ten percent of the width of the respective character-representing elements RC21 and RC31.

In each of the embodiments of the invention, the reflectivity of the record media RM, RM1, RM2, RM3 and RM4 differs from the reflectivity of the printed characters C, C1, C2, C11, C21, C31, C41 and C42 so that the characters can be optically sensed. Frequently, these characters would be printed with black ink and the record medium would be white or a color of an optical reflectivity other than black. However, it is feasible to have the printed bars of one color or reflectivity such as black and the printed intervening spaces of a second color or reflectivity such as green, on a record medium of a third color or reflectivity such as white.

Other embodiments and modifications of this invention will suggest themselves to those skilled in the art, and all such of these as come within the spirit of this invention are included within its scope as best defined by the appended claims.

I claim:
1. A record, comprising:
a record member, and
a machine readable character printed on the record member and including at least one line and a printability gauge having an intra-character gap across the line, the optical reflectivity of the character differing from the optical reflectivity of the record adjacent the character, the gap having a width which is substantially constant and substantially less than the width of the line.
2. A record as defined in claim 1, wherein the intra-character gap has a width less than 0.005 inch.
3. A record as defined in claim 1, wherein the width of the gap is less than about five percent of the width of the character.
4. A record as defined in claim 1, wherein the width of the gap is less than about ten percent of the width of the line.

* * * * *